United States Patent
Zhang et al.

(10) Patent No.: US 11,688,412 B2
(45) Date of Patent: Jun. 27, 2023

(54) MULTI-MODAL FRAMEWORK FOR MULTI-CHANNEL TARGET SPEECH SEPARATION

(71) Applicant: TENCENT AMERICA LLC, Palo Alto, CA (US)

(72) Inventors: Shi-Xiong Zhang, Redmond, WA (US); Yong Xu, Bellevue, WA (US); Meng Yu, Bellevue, WA (US); Dong Yu, Bothell, WA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 269 days.

(21) Appl. No.: 16/901,487

(22) Filed: Jun. 15, 2020

(65) Prior Publication Data

US 2021/0390970 A1 Dec. 16, 2021

(51) Int. Cl.
| | | |
|---|---|---|
| *G06V 40/16* | (2022.01) | |
| *G10L 21/0272* | (2013.01) | |
| *G10L 17/00* | (2013.01) | |
| *G06T 11/60* | (2006.01) | |
| *G06T 7/20* | (2017.01) | |
| *G06N 3/02* | (2006.01) | |
| *G06T 7/00* | (2017.01) | |
| *G06V 20/40* | (2022.01) | |

(52) U.S. Cl.
CPC ............ *G10L 21/0272* (2013.01); *G06N 3/02* (2013.01); *G06T 7/0012* (2013.01); *G06T 7/20* (2013.01); *G06T 11/60* (2013.01); *G06V 20/46* (2022.01); *G06V 40/171* (2022.01); *G10L 17/00* (2013.01); *G06T 2207/10016* (2013.01); *G06T 2207/20084* (2013.01); *G06T 2207/30201* (2013.01); *G06T 2210/22* (2013.01)

(58) Field of Classification Search
CPC ......... G10L 15/26; G10L 17/00; G10L 15/22; G10L 13/00; G10L 15/1822; G10L 21/0272; G10L 15/25; G10L 2015/227; G10L 21/0308; G06V 40/16; G06V 40/20; G06V 40/171; G06V 10/82; G06V 20/20; G06V 40/161; G06V 40/10; G06V 20/46
See application file for complete search history.

(56) References Cited

U.S. PATENT DOCUMENTS

| | | | | |
|---|---|---|---|---|
| 2007/0081529 | A1* | 4/2007 | Sugiyama | G06F 40/40 370/382 |
| 2016/0182856 | A1* | 6/2016 | Child | H04N 23/69 348/14.16 |
| 2017/0069327 | A1* | 3/2017 | Heigold | G10L 17/04 |
| 2019/0043508 | A1* | 2/2019 | Sak | G10L 17/22 |
| 2021/0327447 | A1* | 10/2021 | Maeng | G06V 20/20 |
| 2021/0385212 | A1* | 12/2021 | Tagra | H04L 63/0861 |
| 2022/0021985 | A1* | 1/2022 | Wexler | G10L 25/51 |

FOREIGN PATENT DOCUMENTS

CN 110351591 A * 10/2019

* cited by examiner

*Primary Examiner* — Quan M Hua
(74) *Attorney, Agent, or Firm* — Sughrue Mion, PLLC

(57) ABSTRACT

A method, computer program, and computer system for separating a target voice from among a plurality of speakers is provided. Video data associated with the plurality of speakers and audio data associated with each of the one or more speakers are received. Video feature data is extracted from the received video data. The target voice is identified from among the plurality of speakers based on the received audio data and the extracted video feature data.

20 Claims, 6 Drawing Sheets

MULTI-MODAL FRAMEWORK FOR MULTI-CHANNEL TARGET SPEECH SEPARATION

BACKGROUND

This disclosure relates generally to field of computing, and more particularly to speech recognition.

Target speech separation extracts the speech of interest from an observed speech mixture. With the entry into deep learning era, most existing supervised approaches are based on spectrogram masking, where the weight (mask) of the target speaker at each time-frequency (T-F) bin of mixture spectrogram is estimated. As a result, the multiplicative product between the mixture spectrogram and the predicted mask is served as the target speech spectrogram.

SUMMARY

Embodiments relate to a method, system, and computer readable medium for separating a target voice from among a plurality of speakers. According to one aspect, a method for separating a target voice from among a plurality of speakers is provided. The method may include receiving video data associated with the plurality of speakers and receiving audio data associated with each of the one or more speakers. Video feature data may be extracted from the received video data. The target voice may be identified from among the plurality of speakers based on the received audio data and the extracted video feature data.

According to another aspect, a computer system for separating a target voice from among a plurality of speakers is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include receiving video data associated with the plurality of speakers and receiving audio data associated with each of the one or more speakers. Video feature data may be extracted from the received video data. The target voice may be identified from among the plurality of speakers based on the received audio data and the extracted video feature data.

According to yet another aspect, a computer readable medium for separating a target voice from among a plurality of speakers is provided. The computer readable medium may include one or more computer-readable storage devices and program instructions stored on at least one of the one or more tangible storage devices, the program instructions executable by a processor. The program instructions are executable by a processor for performing a method that may accordingly include receiving video data associated with the plurality of speakers and receiving audio data associated with each of the one or more speakers. Video feature data may be extracted from the received video data. The target voice may be identified from among the plurality of speakers based on the received audio data and the extracted video feature data.

BRIEF DESCRIPTION OF THE DRAWINGS

These and other objects, features and advantages will become apparent from the following detailed description of illustrative embodiments, which is to be read in connection with the accompanying drawings. The various features of the drawings are not to scale as the illustrations are for clarity in facilitating the understanding of one skilled in the art in conjunction with the detailed description. In the drawings.

DETAILED DESCRIPTION

Figure 1:
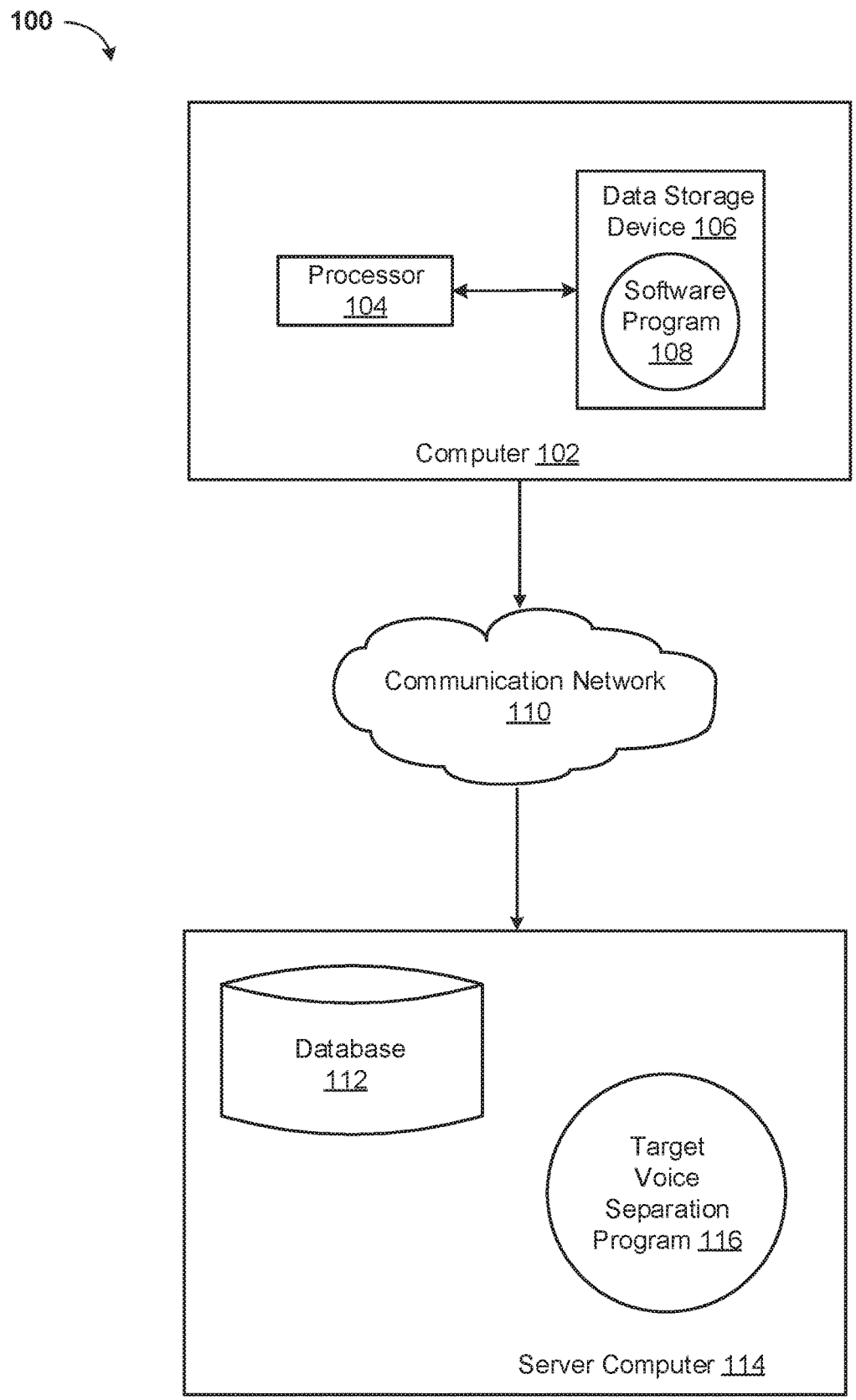
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. Those structures and methods may, however, be embodied in many different forms and should not be construed as limited to the exemplary embodiments set forth herein. Rather, these exemplary embodiments are provided so that this disclosure will be thorough and complete and will fully convey the scope to those skilled in the art. In the description, details of well-known features and techniques may be omitted to avoid unnecessarily obscuring the presented embodiments.

Embodiments relate generally to the field of computing, and more particularly to speech recognition. The following described exemplary embodiments provide a system, method and computer program to, among other things, separate a target voice from among a plurality of speakers. Therefore, some embodiments have the capacity to improve the field of computing by allowing for isolation of a single speaker voice's from data containing the voices of multiple speakers based on extracting audio and video features from the data.

As previously described, target speech separation extracts the speech of interest from an observed speech mixture. With the entry into deep learning era, most existing supervised approaches are based on spectrogram masking, where the weight (mask) of the target speaker at each time-frequency (T-F) bin of mixture spectrogram is estimated. As a result, the multiplicative product between the mixture spectrogram and the predicted mask is served as the target speech spectrogram. However, these approaches only use audio information, termed as audio-only approaches, often suffering from intense interferences in complex acoustic environment, such as noise and reverberation. Since the acoustic target information can be blurry in the challenging acoustic environment, other modalities can provide complementary and steady information to increase the robustness. Therefore, it may be advantageous to use a general multi-modal framework, aimed at extracting speech of a desired speaker in a synchronized video and multi-channel audio corrupted by noise and reverberation.

Aspects are described herein with reference to flowchart illustrations and/or block diagrams of methods, apparatus (systems), and computer readable media according to the various embodiments. It will be understood that each block of the flowchart illustrations and/or block diagrams, and combinations of blocks in the flowchart illustrations and/or block diagrams, can be implemented by computer readable program instructions.

The following described exemplary embodiments provide a system, method and computer program that extracts and integrates multi-modal separation cues from multi-channel speech mixture, target speaker's lip movements, and voice recordings to boost the performance. Additionally, in order to efficiently explore and exploit the high-level correlation between modalities, a factorized attention based multi-modality fusion method may be used for target speech separation. Specifically, a multi-stream structure may take the multi-channel mixture, mouth images cropped from a synchronized video, and an enrollment utterance of the target speaker as input and may extract the target speech with all other interfering signals suppressed. By leveraging the microphone array-based signal processing techniques, the audio stream can fully utilize the spectral and spatial property of multi-channel speech signal to obtain a more complete and robust target-related acoustic representation. The video stream may capture the spatio-temporal dynamics of mouth movements and produces lip embeddings. The speaker embedding stream may map a clean reference audio of the target speaker to a feature vector which contains the speaker-specific information. A factorized attention-based aggregation method may be used for fusing the high-level semantic information of multi-modalities at embedding level.

Referring now to FIG. 1, a functional block diagram of a networked computer environment illustrating a target voice separation system 100 (hereinafter "system") for separating a target voice from among a plurality of speakers. It should be appreciated that FIG. 1 provides only an illustration of one implementation and does not imply any limitations with regard to the environments in which different embodiments may be implemented. Many modifications to the depicted environments may be made based on design and implementation requirements.

The system 100 may include a computer 102 and a server computer 114. The computer 102 may communicate with the server computer 114 via a communication network 110 (hereinafter "network"). The computer 102 may include a processor 104 and a software program 108 that is stored on a data storage device 106 and is enabled to interface with a user and communicate with the server computer 114. As will be discussed below with reference to FIG. 4 the computer 102 may include internal components 800A and external components 900A, respectively, and the server computer 114 may include internal components 800B and external components 900B, respectively. The computer 102 may be, for example, a mobile device, a telephone, a personal digital assistant, a netbook, a laptop computer, a tablet computer, a desktop computer, or any type of computing devices capable of running a program, accessing a network, and accessing a database.

The server computer 114 may also operate in a cloud computing service model, such as Software as a Service (SaaS), Platform as a Service (PaaS), or Infrastructure as a Service (IaaS), as discussed below with respect to FIGS. 6 and 7. The server computer 114 may also be located in a cloud computing deployment model, such as a private cloud, community cloud, public cloud, or hybrid cloud.

The server computer 114, which may be used for separating a target voice from among a plurality of speakers is enabled to run a Target Voice Separation Program 116 (hereinafter "program") that may interact with a database 112. The Target Voice Separation Program method is explained in more detail below with respect to FIG. 3. In one embodiment, the computer 102 may operate as an input device including a user interface while the program 116 may run primarily on server computer 114. In an alternative embodiment, the program 116 may run primarily on one or more computers 102 while the server computer 114 may be used for processing and storage of data used by the program 116. It should be noted that the program 116 may be a standalone program or may be integrated into a larger target voice separation program.

It should be noted, however, that processing for the program 116 may, in some instances be shared amongst the computers 102 and the server computers 114 in any ratio. In another embodiment, the program 116 may operate on more than one computer, server computer, or some combination of computers and server computers, for example, a plurality of computers 102 communicating across the network 110 with a single server computer 114. In another embodiment, for example, the program 116 may operate on a plurality of server computers 114 communicating across the network 110 with a plurality of client computers. Alternatively, the program may operate on a network server communicating across the network with a server and a plurality of client computers.

The network 110 may include wired connections, wireless connections, fiber optic connections, or some combination thereof. In general, the network 110 can be any combination of connections and protocols that will support communications between the computer 102 and the server computer 114. The network 110 may include various types of networks, such as, for example, a local area network (LAN), a wide area network (WAN) such as the Internet, a telecommunication network such as the Public Switched Telephone Network (PSTN), a wireless network, a public switched network, a satellite network, a cellular network (e.g., a fifth generation (5G) network, a long-term evolution (LTE) network, a third generation (3G) network, a code division multiple access (CDMA) network, etc.), a public land mobile network (PLMN), a metropolitan area network (MAN), a private network, an ad hoc network, an intranet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of system 100 may perform one or more functions described as being performed by another set of devices of system 100.

Figure 2:
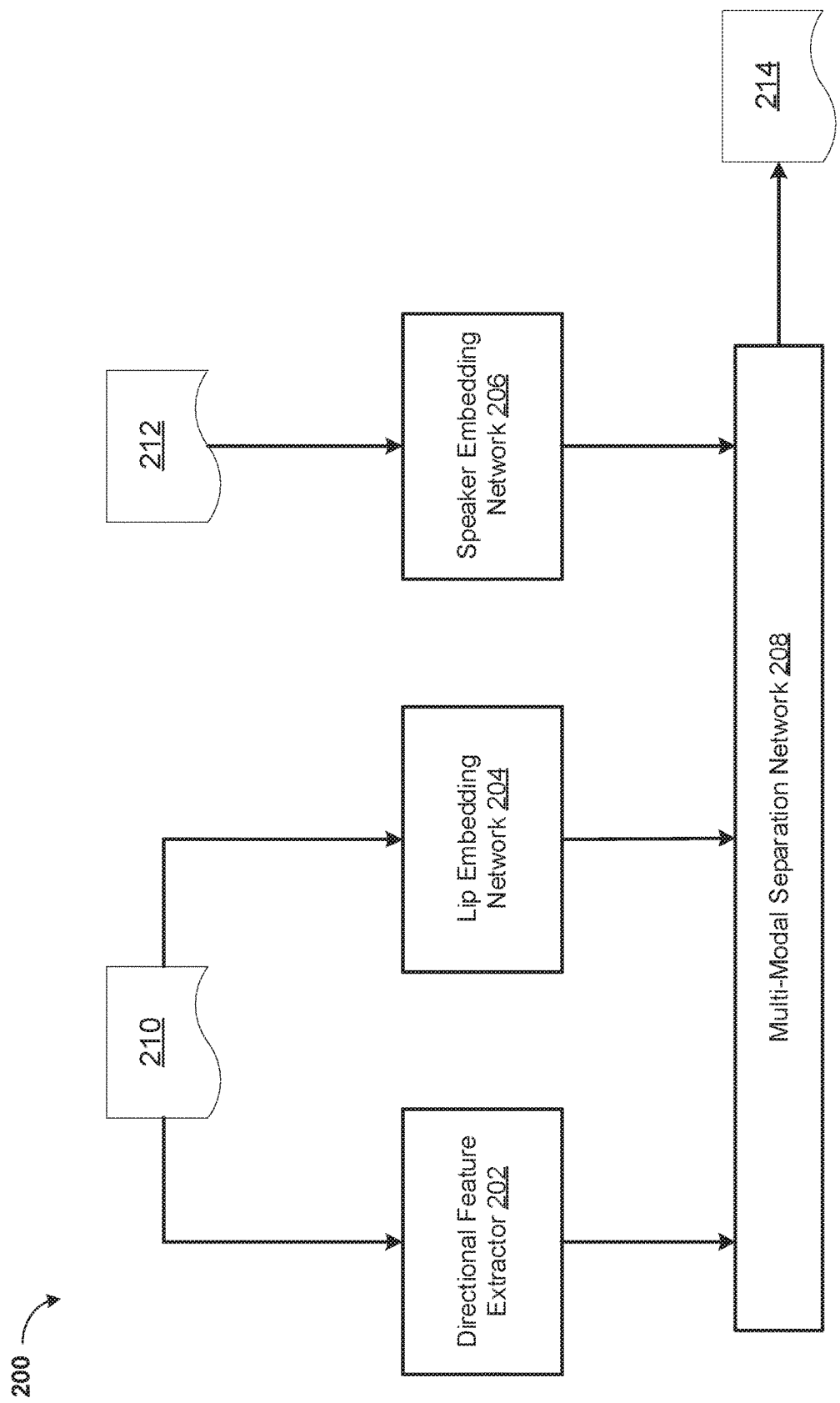
FIG. 2 is a block diagram of a system for separating a target voice from among a plurality of speakers, according to at least one embodiment.

Referring now to FIG. 2, a block diagram 200 of a multi-modal target speech separation system is depicted. The multi-modal target speech separation system may include, among other things, a directional feature extractor 202, a lip embedding network 204, a speaker embedding network 206, and a multi-modal separation network 208.

The multi-modal speech separation system may receive video data 210 and audio data 212 as inputs. The multi-modal separation network 208 may output target speech data 214.

The directional feature extractor 202 may take a noisy, multi-channel speech mixture and the target speaker's direction as input, in order to extract acoustic embeddings. A short-time Fourier transform (STFT) convolution 1D layer may be used to map the multi-channel mixture waveforms to complex spectrograms. Based on the complex spectrograms, the single-channel spectral feature (i.e., logarithm power spectra, LPS) and multi-channel spatial feature (i.e., inter-aural phase differences, IPD) may be extracted. Apart from the target speaker independent spectral and spatial features, a directional feature may be extracted according to the spatial direction of target speaker. All of the features may be concatenated and fed into audio blocks, which may include stacked dilated convolutional layers with exponentially growing dilation factors. The output of the audio blocks may include one or more acoustic embeddings. On the system output side, an iSTFT convolution 1D layer may be used to convert the estimated target speaker complex spectrogram back to the waveform.

The lip embedding network 204 may extract frame-level lip embeddings from the video data 210. The lip embedding network 204 may receive cropped mouth images of the target speaker as input. The lip embedding network 204 may include a temporal-spatio convolution layer and a 18-layer ResNet. The supervision information may be formed from an audio domain, which may use the video data 210 to discover one or more cross-domain correlations between the target speech and lip movements. The lip embedding network 204 may utilize one or more video blocks that may each contain several dilated temporal convolutional layers with residual connections. The output of the video blocks may include one or more lip embeddings. Since the resolution of the video and audio streams may be different, the lip embeddings may be upsampled to synchronize with the audio stream by nearest neighbor interpolation.

The speaker embedding network 206 may process the enrollment audio of a target speaker, such as the audio data 212, and may generate an utterance-level speaker embedding. Speaker embedding may be a bias signal that may inform the multi-modal separation network 208 to perform and enhance target speaker separation. A pre-trained speaker model may be introduced and utilized for producing speaker embeddings to characterize the target speaker. The speaker model may be pre-trained on the task of speaker verification, using one or more convolution layers followed by a fully connected layer. The input to the speaker model may an enrollment utterance of the target speaker, such as saying one's name when entering a teleconference. The speaker embedding network 206 may output the utterance-level speaker embedding.

The multi-modal separation network 208 may combine the acoustic, lip, and speaker embeddings and feed into one or more fusion blocks, which may output a T-F mask for the target speaker. The T-F mask may be used to estimate the target speech waveform. As described above, three kinds of target information may be derived from a set of media sources, including acoustic embeddings from multi-channel speech, lip embeddings from the video and speaker embedding from the target speaker's enrollment. In order to learn effective target speech extraction from multi-modal information, a factorized layer may be used for fast adaptation to the acoustic context. In speech recognition, a factor may be a set of speakers or a specific acoustic environment. The factorized layer may use a different set of parameters to process each acoustic class, which may depend on external factors that represent the acoustic conditions. According to one or more embodiments, the acoustic embeddings may be factorized into a set of acoustic subspaces (e.g., phone subspaces, speaker subspaces) and may utilize information from other modalities to aggregate them with selective attention. The other modalities can also provide information related to the acoustic condition, such as voice activity interpreted from the opening and closing of mouth, and target speaker voice characteristics contained in the speaker embedding. Specifically, the acoustic embeddings A may be factorized into different acoustic subspaces with parallel linear transformations $W_a^1, W_a^2, \ldots, W_a^H$, where H may be the number of subspaces and the acoustic representation in h-th subspace at the t-th time step may be denoted as $a_t^h = A_t W_a^h \in \square^{1 \times P}$, where P is the output dimension of the linear transform. The lip embeddings V may also be mapped from the D-dimensional space to a H-dimensional space, where each dimension h may contain bias information that may correspond to the h-th acoustic subspace. The mapped lip embeddings may be passed to a softmax layer and may produce the estimated posterior for each subspace at each time step, calculated as $v = \text{softmax}(VW_v) = [v^1, v^2, \ldots, v^H] \in \square^{T \times H}$. The fused audio-visual embedding (AVE) may be obtained by summing the weighted contribution of different acoustic subspaces:

$$AVE_t = \sigma\left(\sum_{h=1}^{H} v_t^h a_t^h\right)$$

where σ may be the sigmoid activation function. The acoustic and speaker embeddings may be similarly combined and may be calculated as:

$$ASE_t = \sigma(\Sigma_{h=1}^{H}(\text{softmax}(S_t W_s))^h a_t^h),$$

where $W_s$ may be the weight matrix that may convert the speaker embedding S from speaker space to acoustic subspaces.

Figure 3:
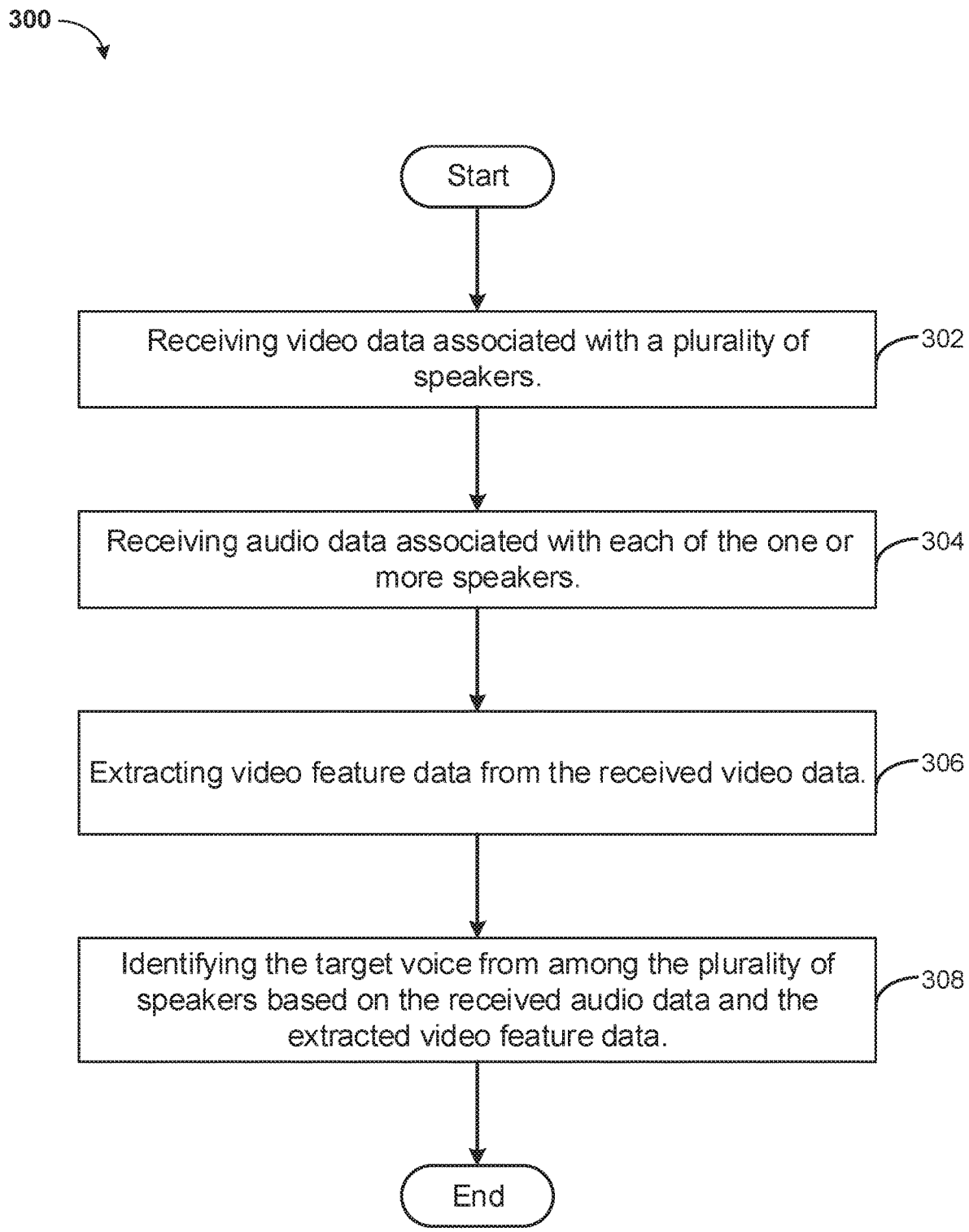
FIG. 3 is an operational flowchart illustrating the operations carried out by a program that separates a target voice from among a plurality of speakers, according to at least one embodiment.

Referring now to FIG. 3, an operational flowchart 300 illustrating the operations carried out by a program that separates a target voice from among a plurality of speakers is depicted. FIG. 3 may be described with the aid of FIGS. 1 and 2. As previously described, the Target Voice Separation Program 116 (FIG. 1) may quickly and effectively utilize audio and video feature data to isolate the voice of a target speaker from among a plurality of other speakers' voices.

At 302, video data associated with the plurality of speakers is received. It may be appreciated that any number of speakers may be captured by any number of cameras. In operation, the Target Voice Separation Program 116 (FIG. 1) on the server computer 114 may receive the video data 210 (FIG. 2) from one or more computers 102 (FIG. 1) over the communication network 110 (FIG. 1).

At 304, audio data associated with each of the one or more speakers is received. The audio data may include an enrollment utterance, such as a speaker saying their name when entering a teleconference. In operation, the Target Voice Separation Program 116 (FIG. 1) on the server computer 114 may receive the audio data 212 (FIG. 2) from one or more computers 102 (FIG. 1) over the communication network 110 (FIG. 1). The audio data 212 may be passed to the speaker embedding network 206 (FIG. 2).

At 306, video feature data is extracted from the received video data. The video feature data may include a direction associated with a camera capturing the one or more speakers and lip movement image data associated with each of the one or more speakers. In operation, the directional feature extractor 202 (FIG. 2) may extract direction data from the video data 210 (FIG. 2). The lip embedding network 204 (FIG. 2) may further extract lip movement data from the video 210.

At 308, the target voice is identified from among the plurality of speakers based on the received audio data and the extracted video feature data. In operation, the multi-modal separation network 208 (FIG. 2) may receive the extracted direction data from the directional feature extractor 202 (FIG. 2), the extracted lip movement data from the lip embedding network 204 (FIG. 2), and features extracted from the audio data 212 (FIG. 2) from the speaker embedding network 206 (FIG. 2). The multi-modal separation network 208 may isolate a target speaker's voice and may output the target speech data 214 (FIG. 2).

It may be appreciated that FIG. 3 provides only an illustration of one implementation and does not imply any limitations with regard to how different embodiments may be implemented. Many modifications to the depicted environments may be made based on design and implementation requirements.

Figure 4:
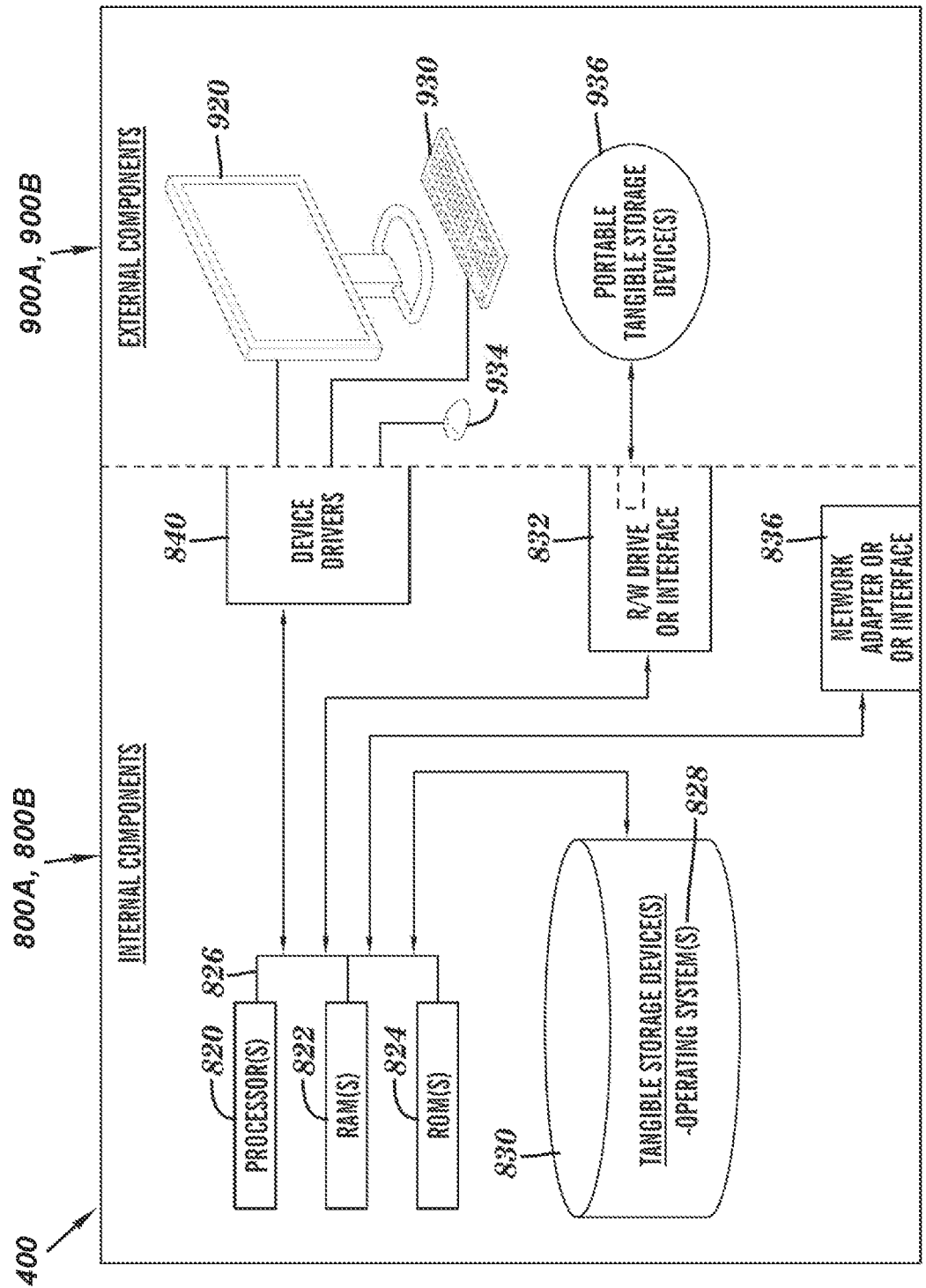
FIG. 4 is a block diagram of internal and external components of computers and servers depicted in FIG. 1 according to at least one embodiment.

FIG. 4 is a block diagram 400 of internal and external components of computers depicted in FIG. 1 in accordance with an illustrative embodiment. It should be appreciated that FIG. 4 provides only an illustration of one implementation and does not imply any limitations with regard to the environments in which different embodiments may be implemented. Many modifications to the depicted environments may be made based on design and implementation requirements.

Computer 102 (FIG. 1) and server computer 114 (FIG. 1) may include respective sets of internal components 800A,B and external components 900A,B illustrated in FIG. 4. Each of the sets of internal components 800 include one or more processors 820, one or more computer-readable RAMs 822 and one or more computer-readable ROMs 824 on one or more buses 826, one or more operating systems 828, and one or more computer-readable tangible storage devices 830.

Processor 820 is implemented in hardware, firmware, or a combination of hardware and software. Processor 820 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 820 includes one or more processors capable of being programmed to perform a function. Bus 826 includes a component that permits communication among the internal components 800A,B.

The one or more operating systems 828, the software program 108 (FIG. 1) and the Target Voice Separation Program 116 (FIG. 1) on server computer 114 (FIG. 1) are stored on one or more of the respective computer-readable tangible storage devices 830 for execution by one or more of the respective processors 820 via one or more of the respective RAMS 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory, an optical disk, a magneto-optic disk, a solid state disk, a compact disc (CD), a digital versatile disc (DVD), a floppy disk, a cartridge, a magnetic tape, and/or another type of non-transitory computer-readable tangible storage device that can store a computer program and digital information.

Each set of internal components 800A,B also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as the software program 108 (FIG. 1) and the Target Voice Separation Program 116 (FIG. 1) can be stored on one or more of the respective portable computer-readable tangible storage devices 936, read via the respective R/W drive or interface 832 and loaded into the respective hard drive 830.

Each set of internal components 800A,B also includes network adapters or interfaces 836 such as a TCP/IP adapter cards; wireless Wi-Fi interface cards; or 3G, 4G, or 5G wireless interface cards or other wired or wireless communication links. The software program 108 (FIG. 1) and the Target Voice Separation Program 116 (FIG. 1) on the server computer 114 (FIG. 1) can be downloaded to the computer 102 (FIG. 1) and server computer 114 from an external computer via a network (for example, the Internet, a local area network or other, wide area network) and respective network adapters or interfaces 836. From the network adapters or interfaces 836, the software program 108 and the Target Voice Separation Program 116 on the server computer 114 are loaded into the respective hard drive 830. The network may comprise copper wires, optical fibers, wireless transmission, routers, firewalls, switches, gateway computers and/or edge servers.

Each of the sets of external components 900A,B can include a computer display monitor 920, a keyboard 930, and a computer mouse 934. External components 900A,B can also include touch screens, virtual keyboards, touch pads, pointing devices, and other human interface devices. Each of the sets of internal components 800A,B also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, some embodiments are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
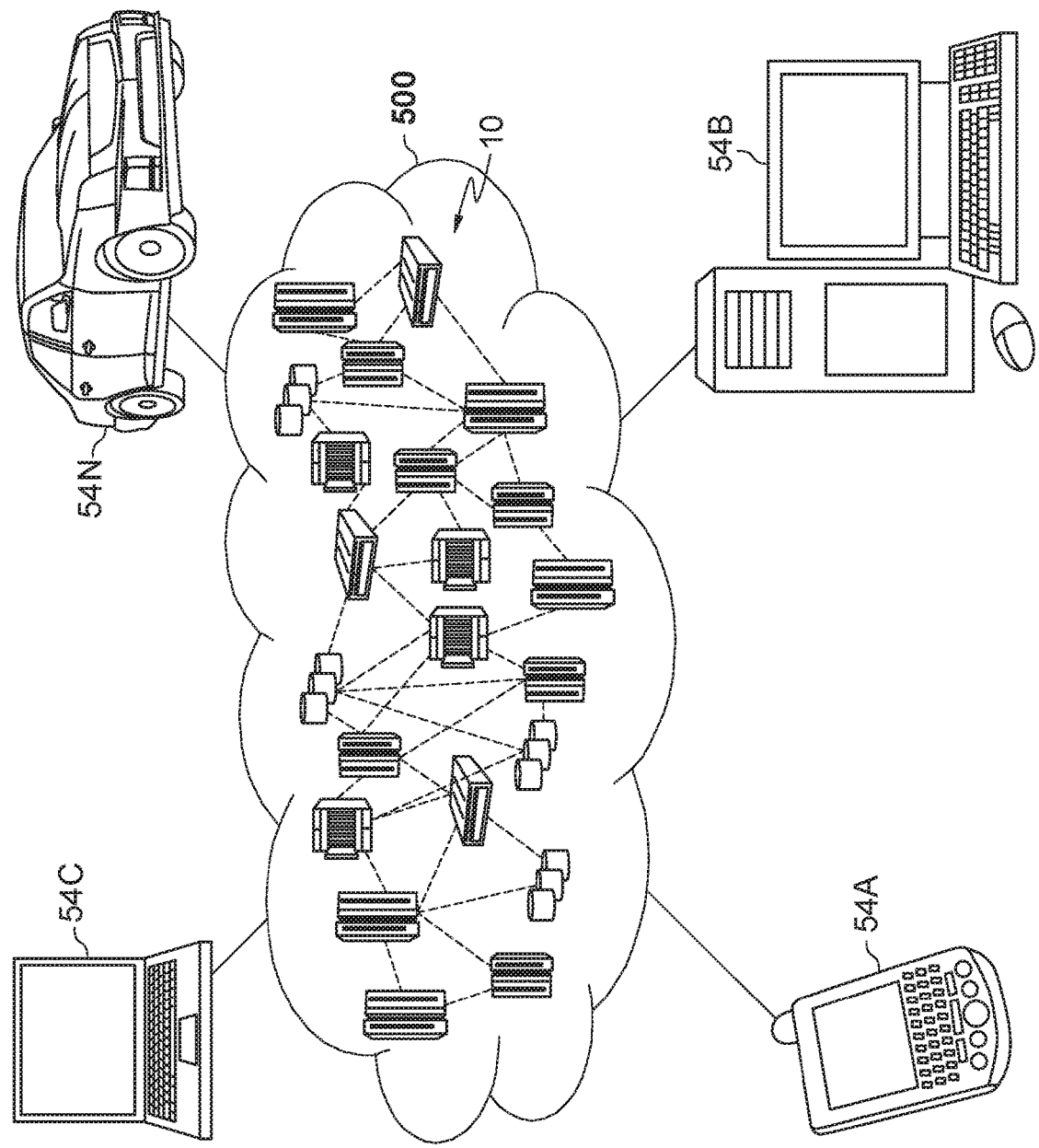
FIG. 5 is a block diagram of an illustrative cloud computing environment including the computer system depicted in FIG. 1, according to at least one embodiment.

Referring to FIG. 5, illustrative cloud computing environment 500 is depicted. As shown, cloud computing environment 500 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 54A-N shown in FIG. 5 are intended to be illustrative only and that cloud computing nodes 10 and cloud computing environment 500 can communicate with any type of computerized device over any type of network and/or network addressable connection (e.g., using a web browser).

Figure 6:
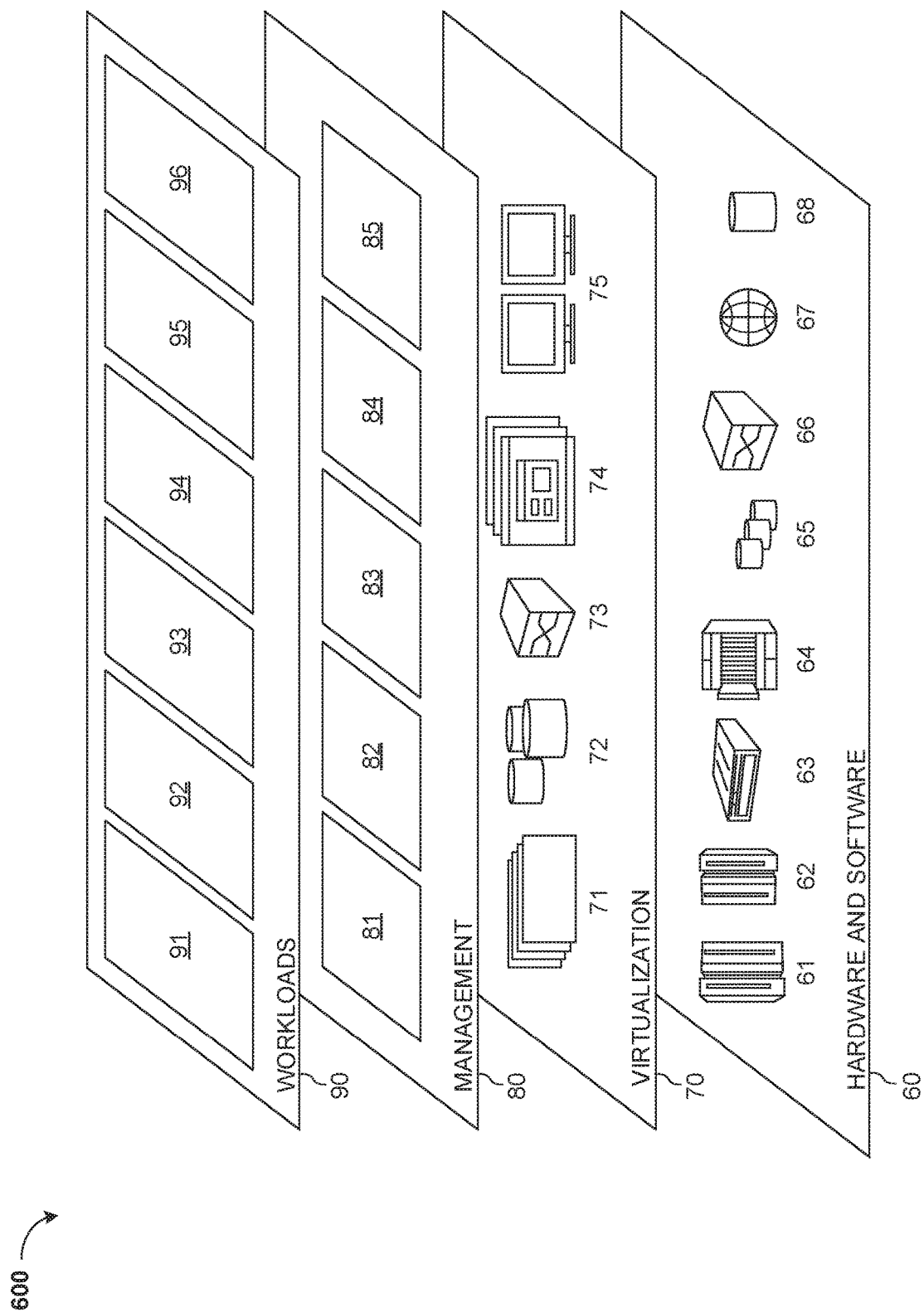
FIG. 6 is a block diagram of functional layers of the illustrative cloud computing environment of FIG. 5, according to at least one embodiment.

Referring to FIG. 6, a set of functional abstraction layers 600 provided by cloud computing environment 500 (FIG. 5) is shown. It should be understood in advance that the components, layers, and functions shown in FIG. 6 are intended to be illustrative only and embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and Target Voice Separation 96. Target Voice Separation 96 may separate a target voice from among a plurality of speakers.

Some embodiments may relate to a system, a method, and/or a computer readable medium at any possible technical detail level of integration. The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The descriptions of the various aspects and embodiments have been presented for purposes of illustration, but are not intended to be exhaustive or limited to the embodiments disclosed. Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of separating a target voice from among a plurality of speakers, the method comprising:
   receiving video data associated with the plurality of speakers;
   receiving audio data associated with each of the one or more speakers, the audio data comprising first audio data, synchronized to the video data, and second audio data comprising an enrollment utterance of at least one of the speakers pre-recorded prior to recording the video data;
   extracting video feature data from the received video data;
   identifying the target voice from among the plurality of speakers based on a mask generated by using inputs comprising at least the first audio data, the second audio data, and the extracted video feature data.

2. The method of claim 1, wherein the extracted video feature data comprises direction data corresponding to the one or more users.

3. The method of claim 1, wherein the extracted video feature data comprises lip movement data corresponding to each of the one or more speakers.

4. The method of claim 3, wherein the lip movement data comprises cropped images corresponding to the mouths of each of the one or more speakers.

5. The method of claim 1, wherein the audio data comprises an enrollment utterances, including the enrollment utterance, associated with each of the one or more speakers.

6. The method of claim 1, wherein identifying the target voice comprises generating the mask as a time-frequency mask for the target speaker.

7. The method of claim 1, wherein the video feature data is extracted using a convolutional neural network.

8. A computer system for separating a target voice from among a plurality of speakers, the computer system comprising:
   one or more computer-readable non-transitory storage media configured to store computer program code; and
   one or more computer processors configured to access said computer program code and operate as instructed by said computer program code, said computer program code including:
   first receiving code configured to cause the one or more computer processors to receive video data associated with the plurality of speakers;
   second receiving code configured to cause the one or more computer processors to receive audio data associated with each of the one or more speakers, the audio data comprising first audio data, synchronized to the video data, and second audio data comprising an enrollment utterance of at least one of the speakers pre-recorded prior to recording the video data;
   extracting code configured to cause the one or more computer processors to extract video feature data from the received video data;
   identifying code configured to cause the one or more computer processors to identify the target voice from among the plurality of speakers based on a mask generated by using inputs comprising at least the first audio data, the second audio data, and the extracted video feature data.

9. The computer system of claim 8, wherein the extracted video feature data comprises direction data corresponding to the one or more users.

10. The computer system of claim 8, wherein the extracted video feature data comprises lip movement data corresponding to each of the one or more speakers.

11. The computer system of claim 10, wherein the lip movement data comprises cropped images corresponding to the mouths of each of the one or more speakers.

12. The computer system of claim 8, wherein the audio data comprises enrollment utterances, including the enrollment utterance, associated with each of the one or more speakers.

13. The computer system of claim 8, wherein identifying the target voice comprises generating the mask as a time-frequency mask for the target speaker.

14. The computer system of claim 8, wherein the video feature data is extracted using a convolutional neural network.

15. A non-transitory computer readable medium having stored thereon a computer program for separating a target voice from among a plurality of speakers, the computer program configured to cause one or more computer processors to:
   receive video data associated with the plurality of speakers;
   receive audio data associated with each of the one or more speakers, the audio data comprising first audio data, synchronized to the video data, and second audio data comprising an enrollment utterance of at least one of the speakers pre-recorded prior to recording the video data;
   extract video feature data from the received video data;
   identify the target voice from among the plurality of speakers based on a mask generated by using inputs comprising at least the first audio data, the second audio data, and the extracted video feature data.

16. The computer readable medium of claim 15, wherein the extracted video feature data comprises direction data corresponding to the one or more users.

17. The computer readable medium of claim 15, wherein the extracted video feature data comprises lip movement data corresponding to each of the one or more speakers.

18. The computer readable medium of claim 17, wherein the lip movement data comprises cropped images corresponding to the mouths of each of the one or more speakers.

19. The computer readable medium of claim 15, wherein the audio data comprises enrollment utterances, including the enrollment utterance, associated with each of the one or more speakers.

20. The computer readable medium of claim 15, wherein identifying the target voice comprises generating the mask as a time-frequency mask for the target speaker.

* * * * *